United States Patent Office 3,162,967
Patented Dec. 29, 1964

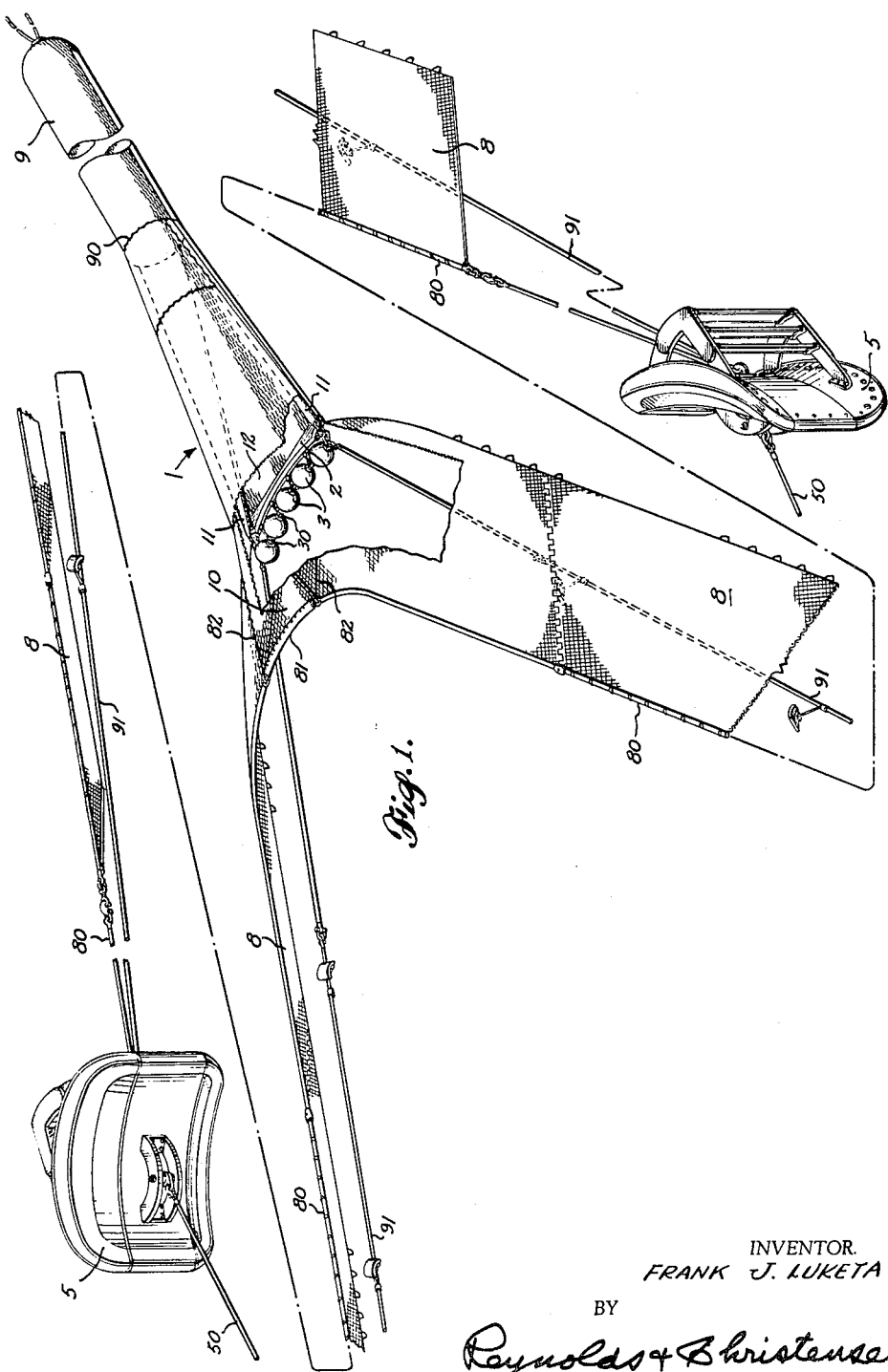
INVENTOR.
FRANK J. LUKETA

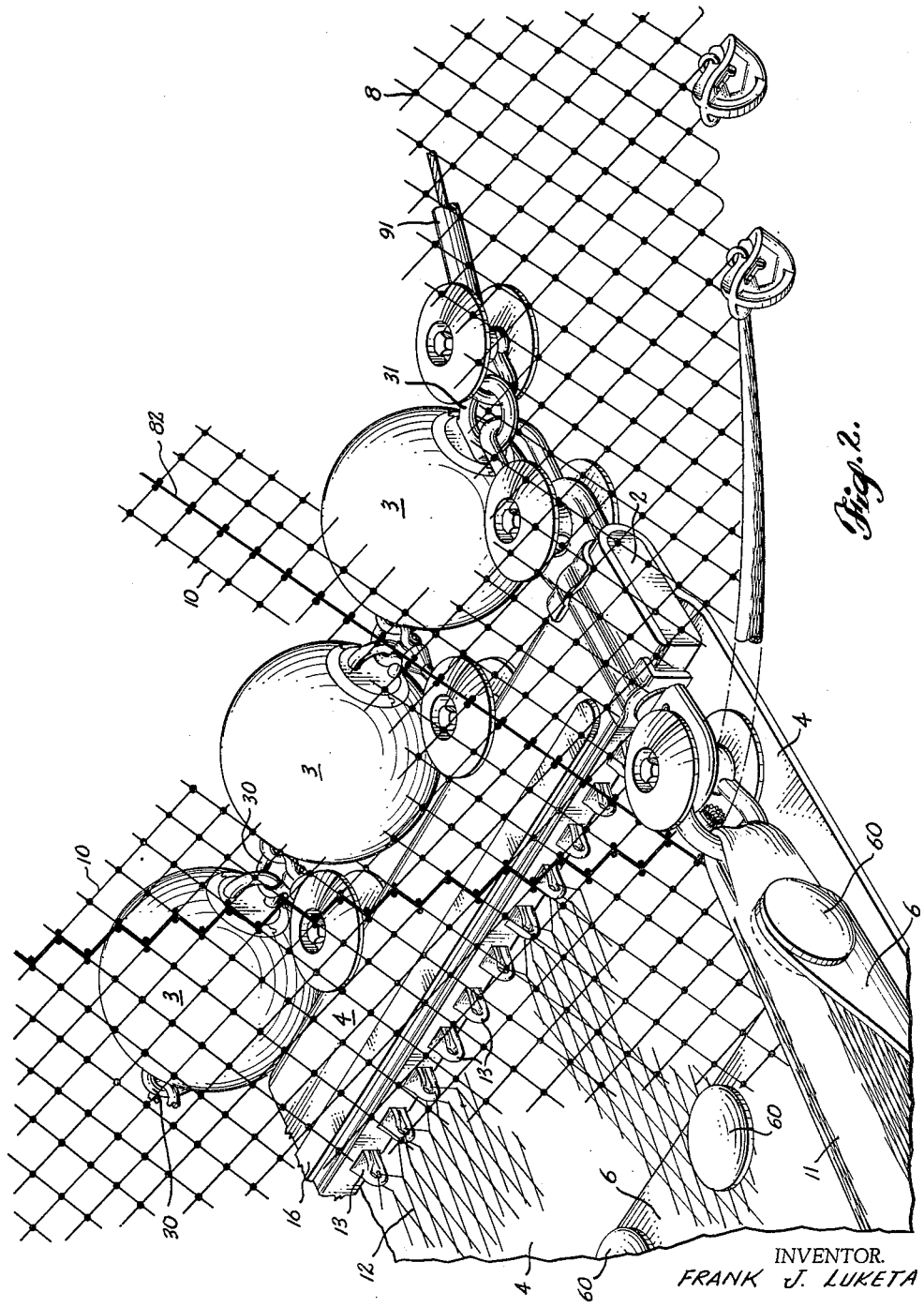

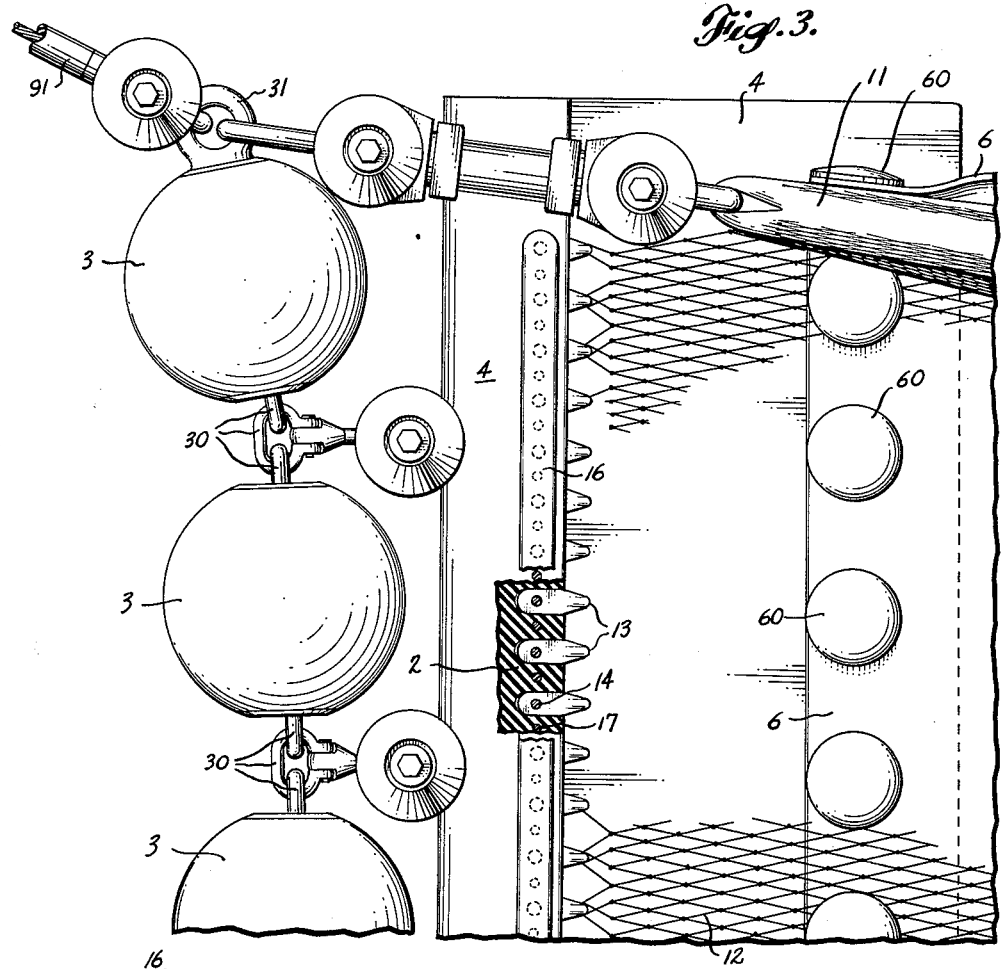
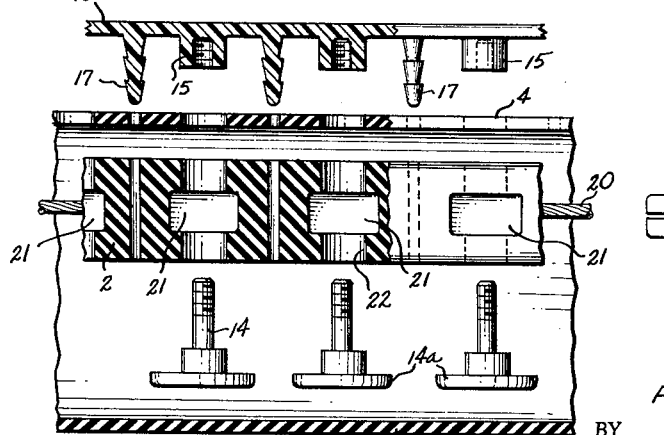

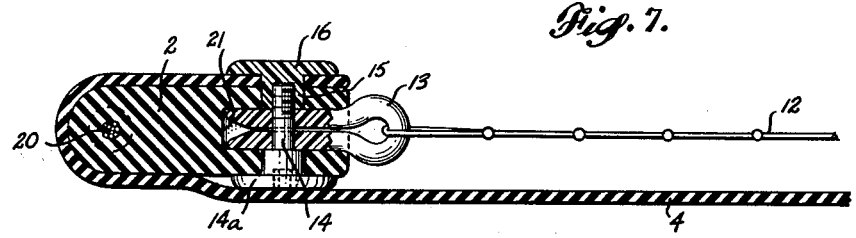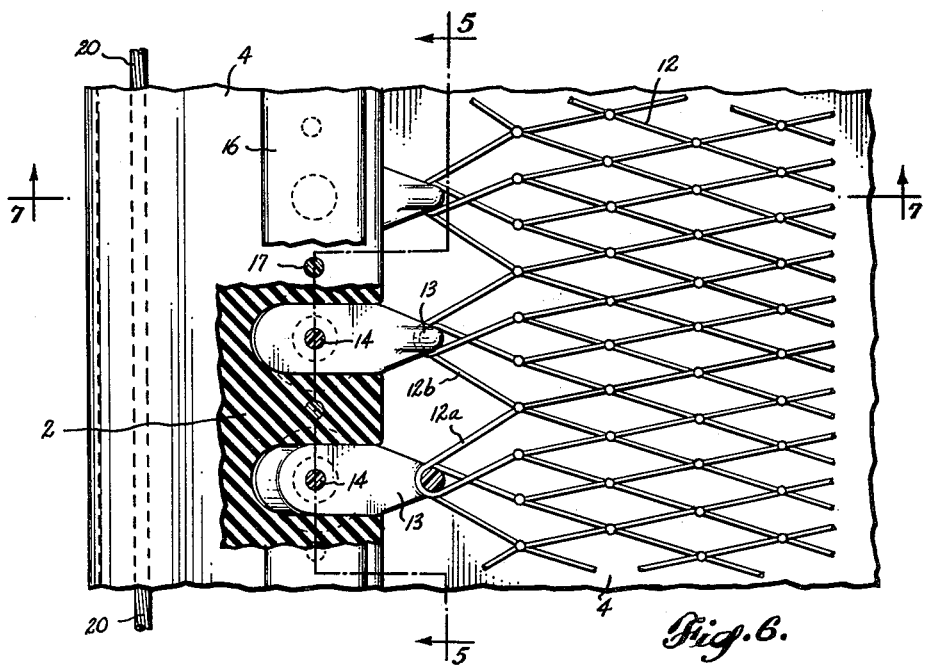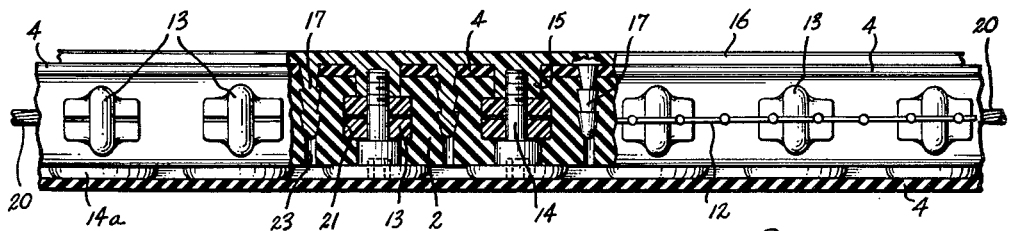

3,162,967
TRAWL NET SUSPENSION
Frank J. Luketa, 5567 Greenwood Ave., Seattle 3, Wash.
Filed Jan. 17, 1963, Ser. No. 252,089
9 Claims. (Cl. 43—9)

In my copending applications Serial No. 178,902 filed March 12, 1962, entitled Suspension for Trawl Net Panels and Chafing Gear, and Serial No. 252,193, filed January 17, 1963, and entitled Lower Bosom Suspension for Trawl Nets, there has been disclosed a suspension element—a sheet of rubber-like material in the first instance, or a bar normally of similar material in the second—whereby to engage the mesh points along the forward edge of the lower panel of a net's funnel, and to define the lower bosom and to distribute evenly the pull of a lower sweep line to the mesh, as the net is dragged forwardly. Since the net is dragged over the bottom, it must be protected from snagging and wear due to contact with the bottom, to which end chafing gear that extends beneath the mesh panel must also be suspended in the vicinity of the lower bosom. If this chafing gear is suspended, as usually it is, from meshes of the lower panel, aft of its forward edge, by means of a number of bolts or pins through the meshes and through the forward edge of the chafing gear at intervals, a protective apron suspended from the suspension element trails aft beneath the gap between the suspension element and the chafing gear proper. This protects the mesh in the gap area.

In the second of the applications mentioned above the suspension of the net panel's forward edge and of the apron are coordinated by means of a hanging line which threads through the forward mesh points and through intervening lugs on the suspension bar, which lugs also serve to retain the apron. It is sometimes desirable, especially in nets of somewhat larger capacity, to avoid reliance on a hanging line which, if it should part (although that is extremely unlikely), would allow separation of the net panel and of the apron from the suspension bar, and to connect the mesh panel more directly to the suspension bar. It is also desirable at times to disconnect the mesh panel, for repair, without disconnecting the apron. The present invention relates to a construction to such ends.

In somewhat greater detail, by the present invention individual meshes of the lower panel are hung by their points, if bar-cut, from clevis-like split elements that might appropriately be termed "clothespins," and these are all inserted within individual recesses or sockets in the suspension bar, and are held against removal thence by strong securing means such as through bolts or pins which transmit the pull directly from the bar to the mesh, yet can be released readily if replacement of a lower mesh panel is required. The apron is suspended, as before, from the same securing means, but reliance is no longer placed upon a hanging line, rather upon the stronger securing means, of a type that the apron need not be released if only the mesh panel requires attention.

The present invention is one of two related inventions both for the same purpose, but achieving like ends by somewhat different constructions. The other is the subject of my copending application Serial No. 252,174, filed January 17, 1963, and entitled Improvements in Trawl Net Suspension.

It is a primary object of this invention to provide a net suspension which in detail is stronger and more reliable than suspensions heretofore known, and also more convenient, and one which is of rather simple construction, and inexpensive.

Further objects will appear hereinafter as this specification proceeds.

FIGURE 1 is an isometric view, broken away in part, illustrating a bottom trawl net which represents a type with which this invention is concerned.

FIGURE 2 is an enlarged isometric view of an end of the suspension bar and associated elements of the trawl net.

FIGURE 3 is a top plan view, partly broken away, of the same assembly as in FIGURE 2.

FIGURE 4 is an enlarged, exploded view, largely in vertical section, of the device of this invention, and FIGURE 5 is an assembled view of the same, the viewpoint being indicated at the line 5—5 of FIGURE 6.

FIGURE 6 is a top plan view, similar to FIGURE 3, but enlarged, and partly in section.

FIGURE 7 is a sectional view at the line 7—7 of FIGURE 6.

Figure 8:
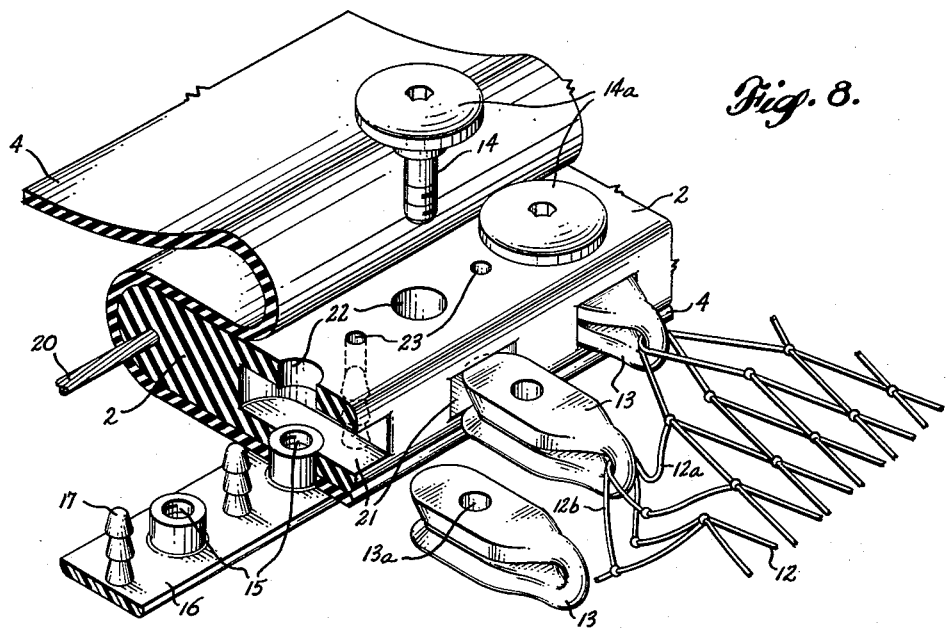
FIGURE 8 is an enlarged isometric view of the suspension bar and associated elements, inverted, partly assembled and partly disassembled.

The net and its rigging are shown generally in FIGURE 1. It includes a door 5 at each side, dragged forwardly over the bottom by a towing warp 50 extending outwardly and aft from the trawler, and spreading apart the curtains 8 which depend from curtain lines 80 which connect to opposite ends of an upper bosom 81, and at their forward ends are anchored to the respective doors. The curtains are free at their lower ends to sweep the bottom. The after ends of the curtains are laced along the lines 82 to the upper mesh panel 10 of a funnel 1 which spreads forwardly from the circle at 90 where the funnel joins the codend 9. Suspenders of mesh at 11, at each side of and constituting in effect part of the funnel, are distributed about and secured at their after end to the codend about the circle at 90. At their forward ends the suspenders 11 are each gathered at a point, and a sweep line 91, buoyed up at intervals in its length, is secured at that point to the corresponding suspender 11, and extends forwardly to an anchorage at the corresponding door 5. The sweep lines, through the suspenders, assume the drag of the codend and its catch.

At the lower bosom of the net a suspension bar 2 is secured to the points at the forward edge of a lower mesh panel 12 of the funnel, in a manner which will be described later; this is the subject of this invention. The suspension bar 2 is connected at its ends between the suspender 11 and the sweep line 91. A transverse bobbin line 30 precedes and is joined at intervals to the suspension bar 2; bobbins 3 roll on this bobbin line when the net is being dragged over the bottom. The bobbin line is also connected at its ends 31 between the suspenders and the corresponding sweep line. For details of such connections reference is made to my aforementioned copending application Serial No. 252,193.

It will be clear from this general description that the suspension bar should remain reasonably straight, and must transmit the pull of the sweep lines 91 evenly to the meshes of lower panel 12, and thence to the lower part of the funnel 1. Also, the meshes of panel 12 must be protected from chafing and snagging upon the bottom. At the same time the mesh panel, and the immediately adjacent parts of the protective gear, must be readily and quickly removable and replaceable, in the event of damage to them. These purposes are all promoted by this invention.

Figure 9:
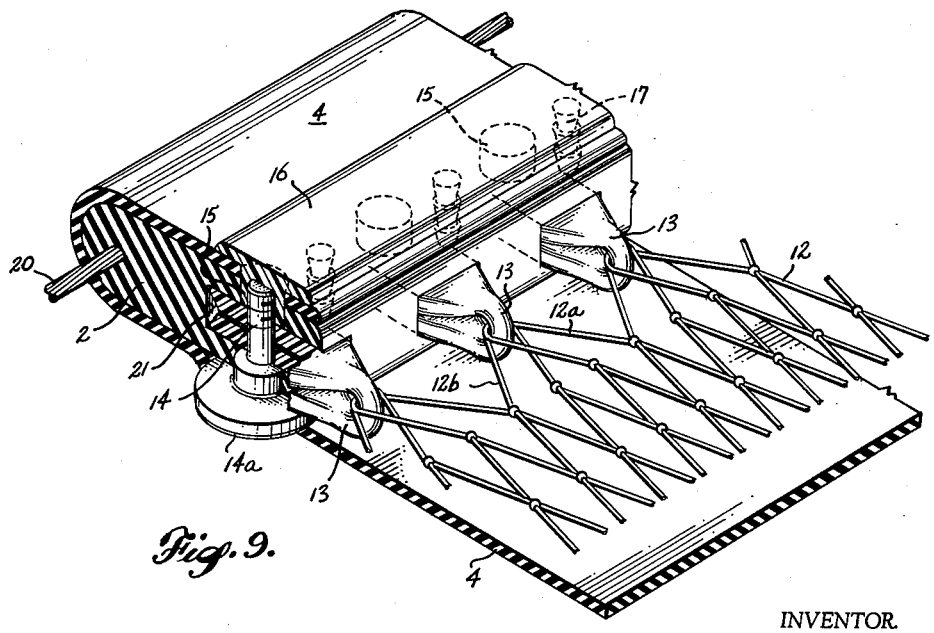
FIGURE 9 is a similar isometric view of the same, fully assembled and right side up.

The suspension bar 2 although it might be rigid, is desirably made of a tough rubber-like material, molded to the desired shape, and preferably having a cable 20 embedded within its forward edge. Preferably it is flat, and elongated transversely of the net. The forward meshes of panel 12 are joined across its rear edge whether singly or in groups or bunches, as FIGURES 6, 8 and 9 in particular show, by a clevis 13 which straddles or is hooked into one or more adjoining points 12a and 12b, and is then thrust within a socket 21 in the bar 2, of a size to receive it snugly. It is held therein by a pin or bolt 14 projecting from that side of bar 2 which is lowermost in use, through a hole 22 (FIGURE 8) in the bar, holes 13a in the clevis 13, and into a nut 15 at the upper side of bar 2. The several nuts 15 are formed integrally with a retainer strip 16 of nylon or the like that extends lengthwise of the suspension bar 2. Thereby they are held against rotation. To secure the retainer strip and its nuts in place, shouldered spikes 17 are thrust into holes 23 in the suspension bar, and their shoulders resist extraction of the spikes. The assembly is effected preferably when the parts including the funnel of the net are inverted as in FIGURE 8; FIGURE 9 illustrates the parts right side up, in position of use. The clevises 13 are closely spaced transversely.

The retainer strip 6 and the bolts 14, with their large, flat heads 14a could be of metal, but even if of nylon or the like, in their position of use (FIGURE 9) the heads 14a would be liable to wear when dragged over the bottom, were it not for the protective apron 4. This apron is wrapped about the forward edge of bar 2, and trails thence aft beneath the heads 14a. It also underlies and protects the mesh of panel 12 from the bar 2 aft past the line where the chafing gear 6 is suspended from the mesh panel 12 by the buttons 60, in known manner. This apron 4 is preferably of a flexible, tough, rubber-like sheet. It is secured along its forward edge by passing the nuts 15 and the spikes 17 through holes provided in the apron, and clamping its edge by passing the nuts 15 and the spikes 17 through holes provided in the apron, and clamping its edge by the retainer strip 16, which then is firmly secured by the bolts 14 and their heads 14a. The apron extends thence forwardly, about the forward edge of suspension bar 2, and then aft beneath the bolt heads 14a, and beneath the chafing gear suspensing buttons 60.

So long as the bolts 14 are in place the clevises 13 cannot be removed and unless the panel 12 tears, and this is virtually impossible since it is completely protected by the chafing gear and apron, the drag of certain net components transmitted by the sweep lines 91 to the suspension bar 2 is distributed evenly throughout the panel 12. Should it become necessary to replace the apron 4, the apron can be thrown back to expose the bolt heads 14a, the bolts 14 can be released, and then the retainer strip can be disengaged from the suspension bar. Should a tear occur in panel 12, removal of the bolts 14 allows the clevises 13 to be removed from their sockets 21 and disengaged from the meshes 12a, 12b without removing the retainer strip 16 or the apron 4. Replacement is thus simplified and expedited, yet all connections are secure against accidental disconnection.

The invention has been described above as applied to the lower, forward mesh panel of a bottom trawl net, and it will find its greatest usefulness so applied. Nevertheless, as a means of applying a drag force concentrated at two separated points, as at the ends of the suspension bar, evenly to the meshes across the forward edge of a mesh panel, the present invention is not to be restricted only to that location, nor even to a bottom trawl net. In a midwater trawl net the mesh panel might equally well be an upper or a lower funnel component, and in a midwater trawl net its bosom might readily be bar-cut rather than point-cut.

I claim as my invention:

1. In combination with a mesh panel of a trawl net having a forward edge, a suspension element directed ahead of such edge, and sweep lines connected to said suspension element to pull the same forwardly, means to connect said suspension element to the edge of the mesh panel to distribute the pull of the sweep lines substantially evenly across the panel, said connecting means comprising a plurality of clevises straddling meshes across such forward edge, the suspension element being recessed to receive the free ends of the clevises and bolts passed through the suspension element and the free ends of the clevises transversely to the general plane of the mesh panel, and releasably secured in such position.

2. The combination of claim 1, wherein the suspension element is in the form of a bar, having sockets recessed into its rear edge, constituting recesses for the reception of the free ends of the clevises.

3. The combination of claim 1, wherein the suspension bar is recessed at intervals constituting but a small multiple of the spacing of the panel's meshes, whereby each clevis straddles a correspondingly small number of meshes.

4. The combination of claim 1, including a retainer strip applied to a surface of the suspension element, and nuts fixed with relation to and spaced along the retainer strip in position to receive the several bolts when the latter are inserted from the surface of the suspension element opposite its surface first mentioned.

5. The combination of claim 4, including additionally spikes on the retainer strip, the suspension element having holes for reception and retention of said spikes.

6. The combination of claim 1, wherein the suspension element is in the form of a bar, and including additionally a flexible apron of protective material, said apron overlying the top of said suspension bar, and being secured thereto by the bolts which secure the clevises, said apron extending thence about the forward edge of the bar and trailing aft beneath the bar and the mesh secured thereto.

7. In combination with the forward edge of a bottom mesh panel of a trawl net, a suspension bar ahead of such edge and formed with sockets along its rear edge, sweep lines connected to said suspension bar to drag the same forwardly, clevises straddling meshes across the panel's forward edge at frequent intervals, the free ends of said clevises being received in said sockets, bolts passed through from the upper surface of the suspension bar and through the free ends of the clevises within their sockets, and nuts at the opposite lower surface of the suspension bar receiving and retaining said bolts.

8. The combination of claim 7, including a retainer strip to which the several nuts are fixed, and applied with the nuts to such lower surface of the suspension bar.

9. The combination of claim 8, including an apron of flexible, wear-resistant material overlying the upper surface of the suspension bar, and held thereto by the bolts, said apron extending about the forward edge of the suspension bar and trailing thence aft beneath the nuts, and beneath the mesh panel aft of the suspension bar.

References Cited in the file of this patent

UNITED STATES PATENTS

| | | |
|---|---|---|
| 1,986,780 | Loring | Jan. 1, 1935 |
| 2,536,251 | Baloun | Jan. 2, 1951 |
| 2,910,796 | Paulsen | Nov. 3, 1959 |

FOREIGN PATENTS

| | | |
|---|---|---|
| 727,652 | Great Britain | Apr. 6, 1955 |